United States Patent [19]

Hayashi et al.

[11] Patent Number: 4,836,965
[45] Date of Patent: Jun. 6, 1989

[54] METHOD OF PRODUCING HEAT TREATING FURNACE MEMBER

[75] Inventors: Kenro Hayashi, Hadano; Takashi Tanaka, Yamagata, both of Japan

[73] Assignee: Toshiba Ceramics Co., Ltd., Tokyo, Japan

[21] Appl. No.: 97,344

[22] Filed: Sep. 8, 1987

Related U.S. Application Data

[63] Continuation of Ser. No. 736,861, May 22, 1985, abandoned.

[30] Foreign Application Priority Data

May 23, 1984 [JP] Japan .................. 59-102713

[51] Int. Cl.$^4$ ............................................. C04B 35/56
[52] U.S. Cl. ........................................ 264/60; 264/62; 264/65; 264/82; 264/86; 264/344
[58] Field of Search ................ 264/60, 86, 62, 65, 264/82, 344

[56] References Cited

U.S. PATENT DOCUMENTS

| | | | |
|---|---|---|---|
| 2,938,807 | 5/1960 | Anderson | 264/60 |
| 3,951,587 | 4/1976 | Alliegro et al. | 264/60 |
| 4,127,629 | 11/1978 | Weaver et al. | 264/86 |
| 4,482,512 | 11/1984 | Alsop | 264/60 |
| 4,619,798 | 10/1986 | Tanaka et al. | 264/82 |

*Primary Examiner*—James Derrington
*Attorney, Agent, or Firm*—Oblon, Fisher, Spivak, McClelland & Maier

[57] ABSTRACT

A method of producing a high density and high strength silicon carbide member for a heat treatment furnace to be used in the manufacture of a semiconductor device. In this method, SiC powder, carbon powder, deflocculating agent and water are mixed to form a slip. Then the slip is formed into a desired shape, cured under a nonoxidizing atmosphere, and removed of any impurity contained in the shaped body. Finally, the shaped body is immersed in a molten silicon to convert the carbon in the shaped body into silicon carbide.

11 Claims, 1 Drawing Sheet

METHOD OF PRODUCING HEAT TREATING FURNACE MEMBER

This application is a continuation of application Ser. No. 06/736,861 filed on May 22, 1985, now abandoned.

BACKGROUND OF THE INVENTION (a) Field of the Invention

This invention relates to a method of producing a heat treating furnace member, particularly, to a method of producing a high density and high strength silicon carbide body for a heat treatment furnace used in the manufacture of a semiconductor device.

(b) Description of the Prior Art

It has been customary to produce a member of a heat treating furnace used in the manufacture of a semiconductor device, particularly, a silicon carbide process tube for a diffusion furnace, as follows. In the first step, a mixture of a SiC powder and a carbon powder is kneaded with a binder added thereto, followed by granulating and subsequently drying the kneaded mixture. The resultant dry grains are preformed into a desired shape by, for example, rubber pressing, followed by evaporating the binder so as to obtain a porous preform. The preform is purified with, for example, a halogen gas. Finally, the purified preform is immersed in a molten silicon bath to form silicon carbide by the reaction between the carbon contained in the preform and the silicon in the molten silicon bath, thereby producing, for example, a silicon carbide process tube for a diffusion furnace.

In the prior art described above, however, rubber pressing is employed for preforming the raw material, with the result that the carbon powder is not dispersed sufficiently uniformly in the preform. Naturally, a dense SiC structure is selectively formed in the subsequent step of immersing the preform in the molten silicon bath in only the regions where the carbon powder is concentrated, with the pores of the preform being simply filled with silicon in the regions where the carbon powder is not dispersed. The situation is shown in FIG. 1. It is seen that the raw material SiC particles 2 and the SiC particles 3 formed by the reaction are locally dispersed in the silicon base 1. It follows that the produced process tube fails to exhibit a sufficiently high density and high mechanical strength. Where the material of a heat treatment furnace has a low density and a low mechanical strength, the durability of the material itself is impaired. In addition, bad influences will be exerted on the quality and characteristics of, for example, a semiconductor wafer which is treated in such a furnace.

SUMMARY OF THE INVENTION

An object of the present invention is to overcome the above-noted problem, and provides a method of producing a high density and high strength silicon carbide body of a heat treating furnace.

According to the present invention, there is provided a method of producing a member of a heat treating furnace, comprising the steps of:

preparing a slip by mixing SiC powder, 5-20% by weight of carbon powder based on the SiC powder, an effective amount of deflocculating agent, and water;

forming the slip into a desired shape;

curing the shaped body under a nonoxidizing gas atmosphere;

removing impurities from the shaped body by a wet or dry process; and immersing the shaped body in a molten silicon to form silicon carbide by the reaction between the impregnated silicon and the carbon contained in the raw material.

DETAILED DESCRIPTION OF THE PREFERRED EMBODIMENT

Figure 1:
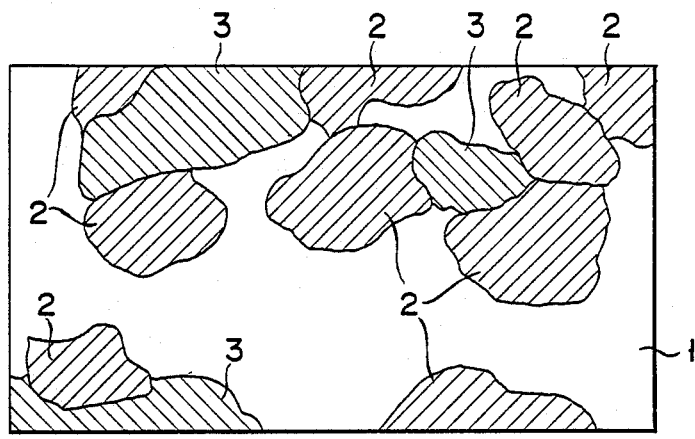
FIG. 1 shows in a magnified fashion the texture of a silicon carbide body for a heat treating furnace produced by the prior art method.

In the present invention, it is desirable to use a SiC powder having a particle diameter of 40 to 1 $\mu$m. Also, the carbon powder used in the present invention should be amorphous or of a graphite form. The particle diameter of the carbon powder should desirably be 5 to 1 $\mu$m. Further, the deflocculating agent used in the present invention includes, for example, sodium silicate and sodium aluminate.

It is important to use the carbon powder in an amount of 5-20% by weight, preferably, 10-15% by weight, based on the amount of the SiC powder. If the amount of the carbon powder is less than 5% by weight, the desired SiC structure is not developed sufficiently in three dimensional directions, failing to achieve the object of the present invention. If the amount mentioned exceeds 20% by weight, however, the raw material mixture is rendered pasty in the shaping step, resulting in failure to obtain a desired shaped body.

The amount of the deflocculating agent should generally be 0.5 to 4% by weight based on the sum of the SiC powder and the C powder. Also, the water should be properly added to enable the resultant slip to have a suitable viscosity.

The slip can be formed into a desired shape by an optional method. In general, a casting method or injection molding is employed for the shaping purpose. The shaped body is cured under a nonoxidizing gas atmosphere such as, in general, $N_2$ gas or argon gas. The curing temperature should desirably be 100° to 300° C.

After the curing step, impurities such as Ni, Fe, Cu, Na and Al are removed from the shaped body by a wet or dry method. In a wet method, the shaped body is first sintered in an inert atmosphere under a temperature of 1800° C. or more and then immersed in a mixed acid consisting of HF, $HNO_3$ and $H_2O$, thereby dissolving out the impurities as mentioned above. Finally, this shaped body is washed with water and dried. In the dry method, which used a halogen gas, the shaped body is heated to a temperature of about 1600°–2000° C. in a furnace which is provided with a means to induce a halogen gas. Thereafter the body is heat-treated in a halogen gas atmosphere. The impurities may be converted to halides and evaporated out of the body. The impurities may be removed by any other conventional methods.

As described above, the raw material mixture is turned into a slip in the present invention, followed by forming the slip in a desired shape by, for example, a casting method or an injection molding. The particular method permits uniformly dispersing the SiC powder and C powder into the shaped body. It follows that the raw material SiC particles and the SiC particles formed by the reaction between carbon and silicon in the subsequent step of immersing the shaped body in a molten silicon bath are connected to each other to form a three dimensional SiC structure. Naturally, the produced SiC material exhibits a high density and a high mechanical strength.

A boat for a diffusion furnace was actually produced by the method of the present invention as follows. In the first step, a mixture consisting of a SiC raw material having an average particle diameter of 4 to 5 μm, 5% by weight of carbon based on the SiC carbide raw material, said carbon having an average particle diameter of 5 μm, and 2% by weight of methanol based on the sum of the SiC and carbon, was kneaded for 10 hours in a pot mill. The kneaded mixture was put in a dryer kept at 80° C. and dried for 5 hours so as to sufficiently evaporate the methanol binder. Then, about 0.3% by weight of sodium silicate and about 35% by weight of water were added to the dried raw material, and the resultant mixture was sufficiently mixed in a pot mill for 2 days so as to prepare a slip. The slip was poured into a gypsum mold, followed by drying the resultant molding so as to obtain a shaped body having a wall thickness of 5 mm. The shaped body was cured for 3 hours at 200° C. under a nitrogen atmosphere, followed by subjecting the cured body to a purifying treatment with a halogen gas. Finally, the purified shaped body was impregnated with a high purity polycrystalline silicon to perform reaction between carbon and silicon, thereby obtaining a desired boat for a diffusion furnace.

Figure 2:
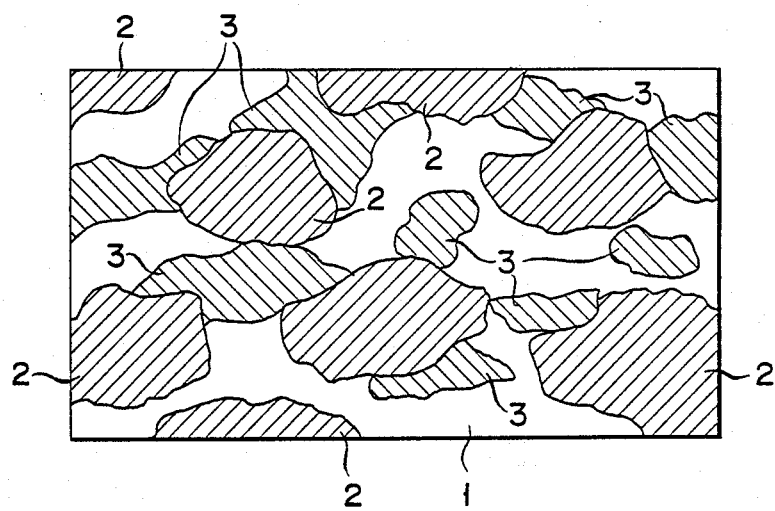
FIG. 2 shows in a magnified fashion the texture of a silicon carbide body for a heat treating furnace produced by the method of the present invention.

FIG. 2 is an electron microscopic view of the produced diffusion furnace boat. It is seen that the raw material SiC particles 2 and SiC particles 3 formed by the reaction are connected to form a uniform three dimensional structure within the silicon base 1. The residual carbon content of the product boat was found to be 0.3% by the element analysis. The density of the boat was found to be 3.05. Further, the mechanical strength (three-point bending strength was found to be 300 MPa, which is markedly higher than that in the prior art. The excellent properties of the boat mentioned above are throught to have been derived from the structure that SiC particles are uniformly dispersed at a high density in the silicon base.

What is claimed is:

1. A method for producing a member of a heat-treating furnace having high-strength and high-density, consisting essentially of:

(a) forming a slip by preparing a mixture consisting essentially of SiC powder, 5-20% by weight of carbon powder based on the SiC powder, an effective amount of a deflocculating agent, and water;
   (b) forming the slip into a shaped body, said shaped body having SiC and carbon substantially uniformly dispersed therein;
   (c) curing the shaped body under a non-oxidizing gas atmosphere;
   (d) removing impurities from the shaped body by a wet or dry process; and
   (e) immersing the shaped body in molten silicon to form silicon carbide by the reaction between the impregnated silicon and the carbon contained in the raw material, to thereby form a three-dimensionally interconnected SiC structure therein.

2. The method according to claim 1, wherein the SiC powder has a particle diameter of 40 to 1 μm, and the particle diameter of the carbon powder ranges between 5 μm and 1 μm.

3. The method according to claim 1, wherein the amount of the deflocculating agent ranges between 0.5 and 4% by weight based on the sum of the SiC powder and carbon powder.

4. The method according to claim 1, wherein the inert gas atmosphere is provided by a $N_2$ gas.

5. The method according to claim 1, wherein said deflocculating agent is sodium silicate or sodium aluminate.

6. The method according to claim 1, wherein said carbon powder is used in the amount of 10-15% by weight.

7. The method according to claim 1, wherein said curing temperature is in the range of 100° to 300° C.

8. The method according to claim 1, wherein said wet process for removing impurities comprises first sintering the shaped body in an inert atmosphere at a temperature of 1800° C. or more, and then immersing the shaped body in a mixed acid consisting of HF, $HNO_3$ and $H_2O$, thereby dissolving out said impurities.

9. The method according to claim 1, wherein said dry process for removing impurities comprises heating the shaped body at a temperature of about 1600°-2000° C. in the presence of a halogen gas atmosphere.

10. The method according to claim 1, wherein said removed impurities comprise Ni, Fe, Cu, Na and Al.

11. The method according to claim 1, wherein said carbon powder is dispersed in a substantially uniform manner in said slip.

* * * * *